United States Patent [19]

Hueftle et al.

[11] 4,444,150

[45] Apr. 24, 1984

[54] ANIMAL RESTRAINING DEVICE

[76] Inventors: Nolan E. Hueftle; Karl N. Hueftle, both of Rte. 2, Box 85, Cozad, Nebr. 69130

[21] Appl. No.: 396,802

[22] Filed: Jul. 9, 1982

[51] Int. Cl.³ .................. A01K 15/04; A61D 3/00
[52] U.S. Cl. .................................. 119/27; 119/98
[58] Field of Search ................. 119/27, 99, 98, 103

[56] References Cited

U.S. PATENT DOCUMENTS

| | | | |
|---|---|---|---|
| 2,099,956 | 11/1937 | Flatley | 119/98 |
| 2,228,582 | 1/1941 | Orpen et al. | 119/27 X |
| 2,593,597 | 4/1952 | Palmer | 119/27 |
| 2,957,451 | 10/1960 | Brockman | 119/99 |
| 2,991,755 | 7/1961 | Ekren et al. | 119/99 X |
| 3,195,513 | 7/1965 | Billhorn | 119/99 |
| 3,520,516 | 7/1970 | Webster | 119/99 X |

FOREIGN PATENT DOCUMENTS 944998  12/1963  United Kingdom .................. 119/99

*Primary Examiner*—Hugh R. Chamblee

*Attorney, Agent, or Firm*—Zarley, McKee, Thomte, Voorhees & Sease

[57] ABSTRACT

An animal restraining device is described which is designed to restrain an animal in a pen to enable the animal to be artificially inseminated. The apparatus comprises an elongated pen having opposite sides and ends. One of the ends of the pen is open to permit the animal to enter the pen. The other end of the pen is selectively closed by a closure means designed to prevent the animal from leaving the pen when in its closed position and designed to permit the animal to leave the pen when in its open position. The restraining apparatus comprises a bar support which is selectively longitudinally movable at one side of the pen. A restraining bar is selectively pivotally mounted on the bar support and is pivotal from a position generally parallel to the side of the pen to a tranversely extending position towards the other side of the pen. After the animal is driven into the pen, the bar is pivotally moved to its operative position. The bar support is then longitudinally moved towards the other end of the pen so that the bar will be positioned closely adjacent the hind legs of the animal to prevent the animal from moving.

3 Claims, 4 Drawing Figures

ANIMAL RESTRAINING DEVICE

BACKGROUND OF THE INVENTION

This invention relates to an animal restraining device and more particularly to an animal restraining device for restraining a cow or the like to enable the cow to be artificially inseminated and/or pregnancy tested.

Many types of animal restraining devices in the forms of crates, pens, etc. have been provided to restrict the movement of an animal while in the crate, pen, etc. to enable various veterinary tasks to be performed on the animal. For example, U.S. Pat. No. 3,520,516 discloses an adjustable crowding alley while U.S. Pat. No. 3,195,513 discloses an adjustable hog crate. U.S. Pat. No. 2,957,451 discloses an attachment for a milking stall comprising a bar which slides across a pen forwardly of the hind legs of an animal. Various other restraining devices have been provided but they all suffer the same shortcomings.

In artificial insemination operations, it is imperative that the animal be restrained as much as possible without causing the animal to be placed under stress. It is also imperative that the upper rearward portion of the animal be accessible to permit the artificial insemination. A problem associated with the vast majority of the previous restraining devices is that they are unable to compensate for various animal sizes. The length of animals being inseminated can vary by as much as one to two feet. Thus, if a restraining device is rigidly fixed behind an animal having a particular length, that restraining device will not work for an animal having a different length. A further problem associated with the prior art devices is that they are not convenient to use.

Therefore, it is a principal object of the invention to provide an improved animal restraining device.

A still further object of the invention is to provide an animal restraining device which may be moved longitudinally relative to the restraining pen so that various animal sizes may be accommodated.

A further object of the invention is to provide an animal restraining device which may be easily longitudinally adjusted and which may be easily placed rearwardly of the hind legs of the animal.

Still another object of the invention is to provide an animal restraining device which is ideally suited for artificial insemination operations.

These and other objects will be apparent to those skilled in the art.

SUMMARY OF THE INVENTION

An animal restraining device is described which is adapted for use in combination with an animal pen having opposite ends and opposite sides. One end of the pen is open to permit the animal to enter the pen. The other end of the pen is selectively closed by a closure means which may be opened to permit the animal to leave the pen and which may be closed to prevent the animal from leaving the pen. An elongated beam is mounted at one side of the pen and has a bar support means selectively longitudinally mounted thereon. A bar is selectively pivotally mounted on the bar support means and may be pivoted from an inoperative position generally parallel to the side of the pen to a transversely extending operative postition which would be positioned closely adjacent the hind legs of the animal. The bar support means may be selectively moved from one end of the beam towards the other end to enable the apparatus to compensate for various animal sizes.

DESCRIPTION OF THE PREFERRED EMBODIMENT

Figure 1:
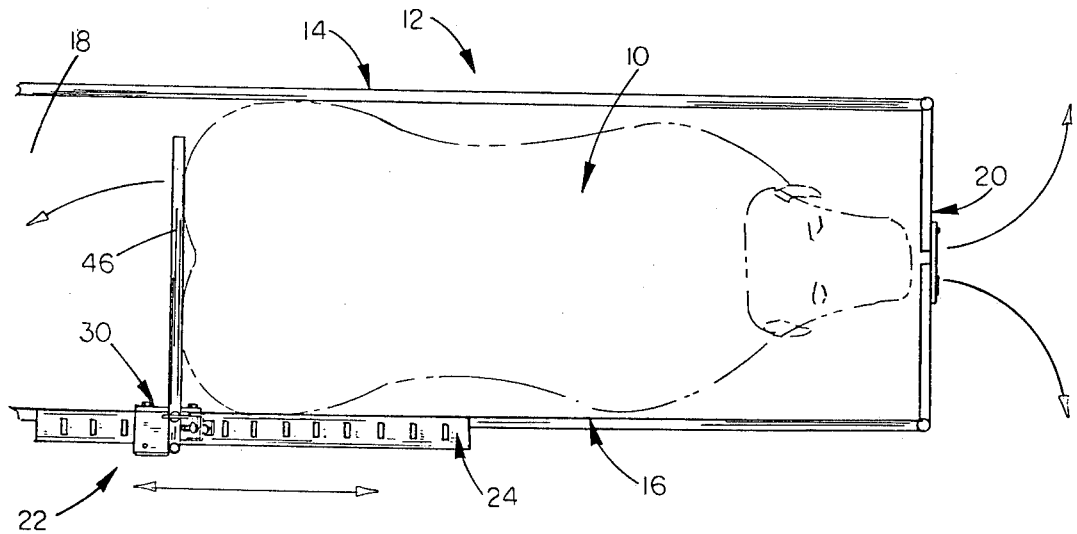
FIG. 1 is a top plan view of the apparatus of this invention with the broken lines illustrating a cow being restrained.
Figure 2:
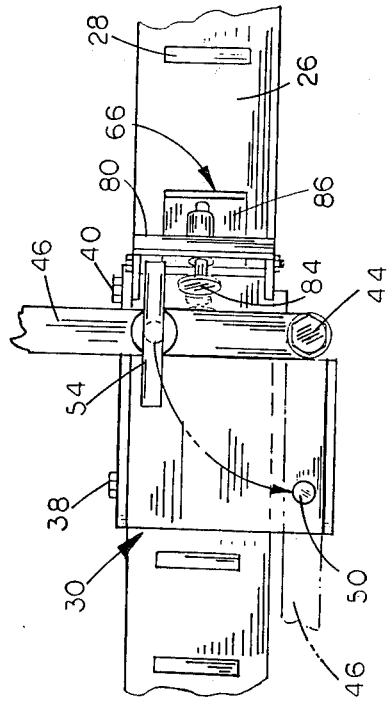
FIG. 2 is a top plan view of a portion of the restraining device.
Figure 3:
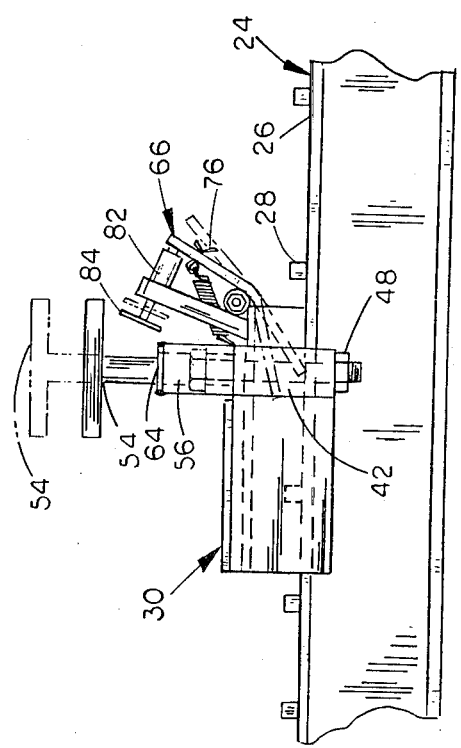
FIG. 3 is a partial side view of the restraining device.

In FIG. 1, the numeral 10 refers to an animal such as a cow or the like which is shown in broken lines. The numeral 12 refers generally to a restraining pen of any particular design including opposite sides 14 and 16. End 18 of pen 12 is open to permit the animal to enter the interior thereof. The other end of the pen 12 is selectively closed by any convenient closure means 20 which is movable between the position shown in solid lines in FIG. 1 to maintain the animal within the pen. When it is desired to permit the animal to leave the pen, the closure means 20 is opened in the direction of the arrows in FIG. 1.

The restraining device of this invention is generally indicated by the reference numeral 22 and is mounted at either of the sides of the pen. For purposes of this description, apparatus 22 will be described as being mounted on side 16 of pen 12. Apparatus 22 generally comprises an elongated I-beam 24 which is mounted in a horizontal fashion and which includes a horizontally disposed upper surface 26 having a plurality of horizontally spaced stops 28 extending upwardly therefrom.

Figure 4:
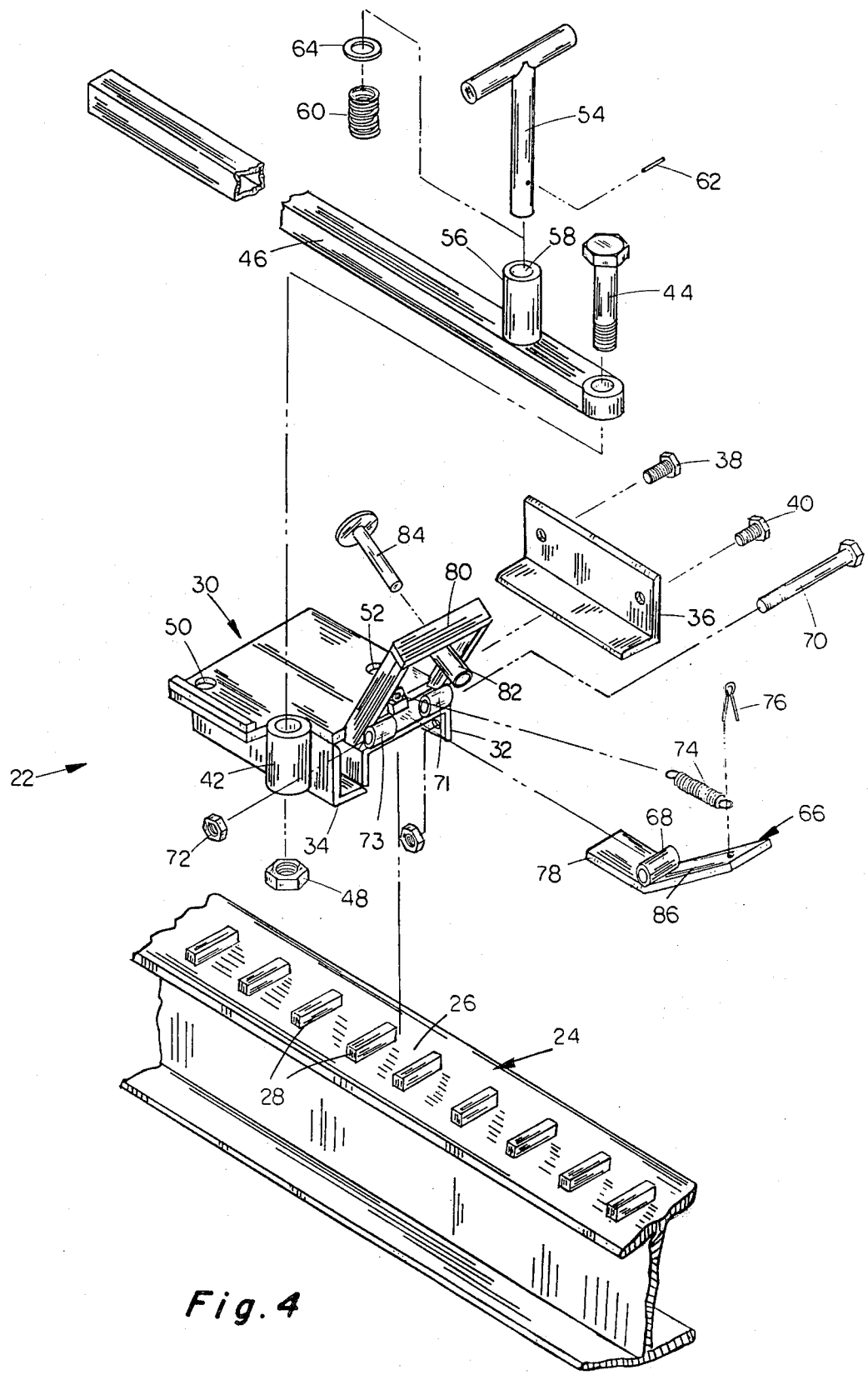
FIG. 4 is a partial exploded perspective view of the restraining device of this invention.

A bar support means 30 is selectively movably mounted on beam 24 and includes an inverted channel member 32 which is adapted to slide upon the upper surface 26 of beam 24. Support means 30 also includes a pair of angle members 34 and 36 having lower ends which are positioned beneath the upper flange of beam 24. As seen in FIG. 4, angle member 36 is maintained on the support means 30 by bolts or screws 38 and 40. A vertically disposed tube 42 is welded or otherwise secured to support means 30 and is adapted to receive bolt 44 extending therethrough. Bolt 44 extends through restraining bar 46 and through the tube 42 and is maintained in position by nut 48. The upper surface of bar support means 30 is provided with a pair of openings 50 and 52 which are adapted to receive the lower end of pin 54 as will be described in more detail hereinafter.

Restraining bar 46 has a tube 56 welded thereto having opening 58 extending therethrough which is adapted to communicate with openings 50 and 52 when the bar 46 is pivoted from the inoperative to operative positions respectively. Pin 54 is vertically movably mounted in tube 56 and is spring loaded by means of spring 60 which is mounted on pin 54 within tube 56 and maintained in position by key or pin 62. Washer 64 is welded to the upper end of tube 56 to maintain the spring within tube 56. Thus, spring 60 yieldably resists the upward movement of the T-pin 54. Pin 54 moves downwardly into either of the openings 50 and 52 depending upon the position of the restraining bar 46.

The numeral 66 refers to a pivotal lever or dog having a tube 68 welded thereto. Bolt 70 extends through the tubes 71 and 73 mounted on channel member 32 and the tube 68 and is maintained in place by nut 72. Spring 74 is secured to dog 66 by cotter key 76 and to bar support means 30 as illustrated in FIG. 4. Spring 74 yieldably maintains the lower end 78 in engagement with the stops 28 as will be described in more detail.

A U-shaped handle 80 extends upwardly from bar support means 30 and has a tube 82 secured thereto by welding or the like which receives a plunger 84. The lower end of plunger 84 is adapted to engage the upper end 86 of dog 66 to pivotally move the lower end of the dog 66 upwardly out of engagement with the stops 28.

The normal method of operation is as follows. Normally, the bar support means 30 would initially be positioned at the left end of the beam 24 as viewed in FIG. 1. Restraining bar 46 would normally be positioned in its inoperative position or generally parallel to the side 16. In the operative position, pin 54 would be received by opening 50 and bar 46 is maintained in its inoperative position. The animal 10 is then driven into the pen 12 until the animal can move no further or is up against the closure means 20. Pin 54 is then raised and the bar 46 is pivotally moved from the inoperative position to the operative position extending transversely from one side of the pen to the other as illustrated in FIG. 1. The bar support means 30 is then longitudinally moved on the beam 24 towards the animal until the bar 46 is in engagement with the hind legs of the animal. Thus, the movement of the bar support means 30 permits the apparatus to compensate for various animal sizes. As bar support means 30 is moved to the right as illustrated in FIG. 1, the lower end 78 of dog 66 passes over the stops 26. When the bar support means 30 has been positioned closely adjacent the hind legs of the animal, the animal cannot move rearwardly since the lower end 78 of dog 66 will engage one of the stops 28 to prevent the rearward movement of the apparatus. Likewise, the bar 46 will be maintained in its transversely extending operative position by the engagement of the pin 54 with the opening 52.

With the restraining apparatus in position as illustrated in FIG. 1, the upper rearward portion of the animal is free of any obstructions to permit the artificial insemination of the same. After the animal has been artificially inseminated, the closure means 20 is opened to permit the animal to leave the pen. Pin 54 is then pulled upwardly from its engagement with opening 52 and the bar 46 is pivotally moved to its inoperative position. The operator then grasps the handle 80 and depresses plunger 84 so that dog 66 pivotally moves out of engagement with the stops 28. The bar support means 30 can then be moved back towards the left end of the beam 24 as illustrated in FIG. 1.

Thus it can be seen that a novel animal restraining device has been provided which adjusts for various animal sizes. It can also be seen that a novel animal restraining device has been provided which is not only easy to use but which positively restrains the animal from movement during the insemination operation. It can also be seen that the restraining bar 46 may be easily moved into position and out of position by simply grasping the T-pin 54. The entire apparatus may be easily moved towards the animal by simply moving the entire assembly longitudinally on the beam 24 and it can be appreciated that such an operation is extremely easy.

Thus it can be seen that the apparatus of this invention accomplishes at least all of its stated objectives.

We claim:

1. An animal restraining device, comprising,
    an elongated animal pen having opposite ends and sides,
    one end of said pen being open to permit the animal to enter said pen,
    closure means selectively closing the other end of said pen whereby said closure means will prevent the animal from passing through said other end of said pen when in its closed position and will permit the animal to leave the pen when in its open position,
    and an animal restraining apparatus selectively longitudinally movably mounted on one side of said pen and including a pivotal bar means which is pivotally movable from an inoperative position generally parallel to the side of said pen to an operative position extending towards the other side of the pen closely rearwardly of the hind legs of the animal to restrain the movement of the animal in said pen,
    said apparatus including a horizontally disposed frame member at said one side of said pen and including a flat horizontally disposed upper surface, a plurality of longitudinally spaced stops on said upper surface,
    a bar support means selectively longitudinally movably mounted on said frame member,
    a spring loaded dog, in engagement with said stops, pivotally mounted on said support means and adapted to engage said stops to prevent said bar support means from moving away from said other end of said pen unless said dog is selectively pivotally moved out of engagement with said stops,
    said dog pivotally moving over said stops as said bar support means is moved towards said other end of said pen,
    means for manually moving said dog out of engagement with said stops to permit said bar support means to be moved towards said one end,
    said bar means being pivotally movable on said bar support means.

2. The device of claim 1 wherein a spring detent means selectively maintains said bar means in its said operative position.

3. An animal restraining device, comprising,
    an elongated animal pen having opposite ends and sides,
    one end of said pen being open to permit the animal to enter said pen,
    closure means selectively closing the other end of said pen whereby said closure means will prevent the animal from passing through said other end of said pen when in its closed position and will permit the animal to leave the pen when in its open position,
    and an animal restraining apparatus selectively longitudinally movably mounted on one side of said pen and including a pivotal bar means which is pivotally movable from an inoperative position generally parallel to the side of said pen to an operative position extending towards the other side of the pen closely rearwardly of the hind legs of the animal to restrain the movement of the animal in said pen,
    said apparatus including a horizontally disposed frame member at said one side of said pen and having a plurality of longitudinally spaced stops thereon, a bar support means selectively longitudinally movably mounted on said frame member, a spring loaded dog means mounted on said support means and adapted to engage said stops to prevent said bar support means from moving away from said other end of said pen unless said dog means is moved out of engagement with said stops, said dog means moving over said stops as said bar support means is moved towards said other end of said pen, said bar means being pivotally movable on said bar support means.

* * * * *